(12) United States Patent
Walters et al.

(10) Patent No.: US 12,200,020 B2
(45) Date of Patent: *Jan. 14, 2025

(54) MERGING COMMUNICATION SESSIONS AND COMMUNICATION CHANNELS

(71) Applicant: Capital One Services, LLC, McLean, VA (US)

(72) Inventors: Austin Walters, Savoy, IL (US);
Jeremy Goodsitt, Champaign, IL (US);
Mark Watson, Sedona, AZ (US);
Vincent Pham, Champaign, IL (US);
Galen Rafferty, Mahomet, IL (US);
Reza Farivar, Champaign, IL (US);
Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,257

(22) Filed: Oct. 11, 2022

(65) Prior Publication Data

US 2023/0032629 A1 Feb. 2, 2023

Related U.S. Application Data

(63) Continuation of application No. 17/321,593, filed on May 17, 2021, now Pat. No. 11,483,358.

(51) Int. Cl.
*H04L 65/1083* (2022.01)
*G06F 40/279* (2020.01)
*H04L 51/04* (2022.01)
*H04L 67/50* (2022.01)

(52) U.S. Cl.
CPC ........ *H04L 65/1086* (2013.01); *G06F 40/279* (2020.01); *H04L 51/04* (2013.01); *H04L 67/535* (2022.05)

(58) Field of Classification Search
CPC ........................... H04L 65/1086; H04L 51/04
USPC .......................................................... 709/206
See application file for complete search history.

(56) References Cited

U.S. PATENT DOCUMENTS

| | | | |
|---|---|---|---|
| 8,645,872 B2 * | 2/2014 | Maxfield | H04M 1/72469 715/753 |
| 8,984,274 B1 | 3/2015 | Kerzner et al. | |
| 2004/0078444 A1 * | 4/2004 | Malik | H04L 51/04 709/217 |
| 2015/0081818 A1 * | 3/2015 | Ye | H04L 65/403 709/206 |
| 2015/0249691 A1 * | 9/2015 | Mutikainen | H04L 65/1104 370/352 |
| 2016/0239192 A1 * | 8/2016 | Chiu | H04L 51/214 |
| 2021/0240729 A1 * | 8/2021 | Grant | G06F 16/215 |
| 2022/0015073 A1 * | 1/2022 | Sarin | H04W 76/15 |
| 2022/0224687 A1 * | 7/2022 | Attard | H04L 51/04 |

* cited by examiner

*Primary Examiner* — Hee Soo Kim
(74) *Attorney, Agent, or Firm* — Banner & Witcoff, Ltd.

(57) ABSTRACT

System, apparatus, and methods are described for monitoring communication sessions and determining to merge two or more of the communication sessions sharing a common ground into a common communication session. A common communication channel may be determined for the common communication session. The two or more communication sessions may be merged to generate the common communication session using the common communication channel.

20 Claims, 7 Drawing Sheets

MERGING COMMUNICATION SESSIONS AND COMMUNICATION CHANNELS

CROSS-REFERENCE TO RELATED APPLICATIONS

This application is a continuation of co-pending U.S. application Ser. No. 17/321,593, filed on May 17, 2021 and entitled "Managing Communication Sessions and Communication Channels," which issued as U.S. Pat. No. 11,483,358 on Oct. 25, 2022, which is hereby incorporated herein by reference in its entirety.

FIELD OF USE

Aspects of the disclosure relate generally to managing communication sessions and communication channels. More specifically, aspects of the disclosure may provide for merging multiple communication sessions into a common communication session and selecting a common communication channel for the common communication session.

BACKGROUND

A user may use any type of communication channels (e.g., an email channel, a mobile text messaging channel, a public or private social media channel, etc.) to communicate with other users. For example, a user may start discussing a book with his brother via email messages in the morning, and then start discussing the same book with his sister via text messages in the afternoon. Two separate communication sessions have been opened using two different communication channels for discussing the same book among three family members. The user may need to switch between an application for sending/receiving email messages and an application for sending/receiving text messages when communicating with his brother and sister, and may need to write an email message and a text message to repeat a same opinion regarding the book. Switching between different communication applications and sending multiple messages for a same opinion may require additional computing resources. Further, because the brother and the sister are in two separate communication sessions, the brother may not be able to see the sister's opinions and the sister may not be able to see the brother's opinions. Aspects described herein may save computing resources and improve user experience.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may monitor communication sessions, determine whether there is any common ground between two or more communication sessions (e.g., whether two or more communication sessions share a similar topic, subject, keyword, time, etc.), determine to merge two or more communication sessions having a common ground into a common communication session, determine a common communication channel for the common communication session, and merge the two or more communication sessions into the common communication session using the common communication channel. The determination of merging two or more communication sessions may be further based on relationships between users associated with the two or more communication sessions. The common communication channel for the common communication session may be determined based on one or more communication channels associated with the two or more communication sessions, one or more communication channels used for prior communication sessions between the users associated with the two or more communication sessions, and/or content (e.g., conversation content) associated with the two or more communication sessions.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for monitoring communication sessions, determining two or more communication sessions having a common ground, determining to merge the two or more communication sessions having a common ground into a common communication session, determining a common communication channel for the common communication session, and merging the two or more communication sessions to generate the common communication channel using the common communication channel. A message processing system may be used to realize the above methods and techniques. As discussed further herein, this combination of features may save computing resources and improve user experience.

Before discussing these concepts in greater detail, however, several examples of a computing device that may be used in implementing and/or otherwise providing various aspects of the disclosure will first be discussed with respect to FIG. 1.

Figure 1:
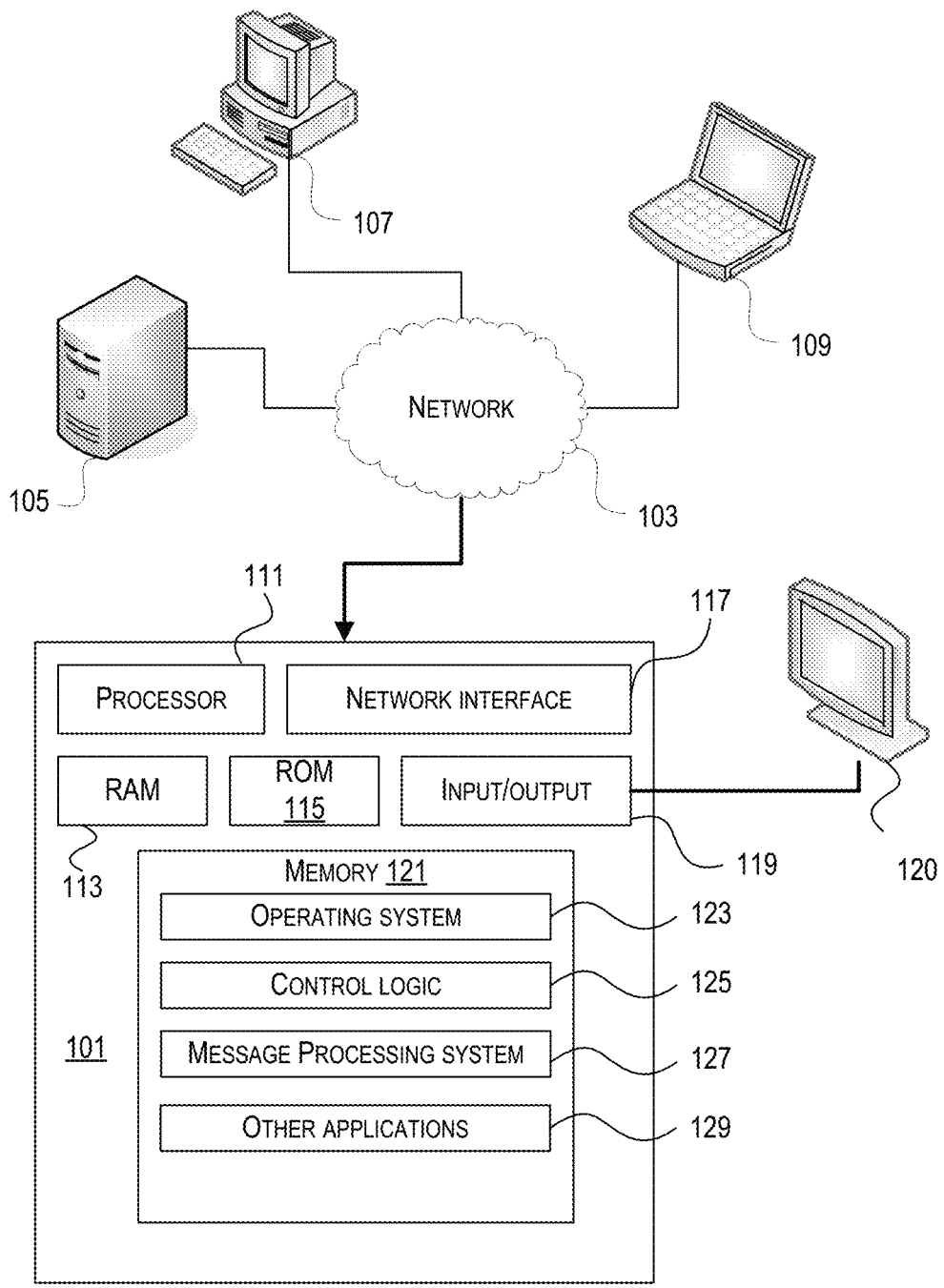
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. The network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, the computing device 101 may include a processor 111, a RAM 113, ROM 115, a network interface 117, input/output interfaces (I/O) 119 (e.g., keyboard, mouse, display, printer, etc.), and a memory 121. The processor 111 may include one or more computer processing units (CPUs), graphical processing units (GPUs), and/or other processing units such as a processor adapted to perform computations associated with machine learning. The I/O 119 may include a variety of interface units and drives for reading, writing, displaying, and/or printing data or files. The I/O 119 may be coupled with a display such as a display 120. The memory 121 may store software for configuring the computing device 101 into a special purpose computing device in order to perform one or more of the various functions discussed herein. The memory 121 may store an operating system software 123 for controlling overall operation of the computing device 101, a control logic 125 for instructing the computing device 101 to perform aspects discussed herein, a message processing system software 127, and other applications 129. Methods of managing communication sessions and communication channels may be implemented in suitable program instructions, such as in the message processing system software 127. The control logic 125 may be incorporated in and may be a part of the message processing system software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or the device 105, 107, 109) as described herein may be spread across multiple data processing devices, for example, to distribute processing load across multiple computers, to segregate transactions based on geographic location, user access level, quality of service (QoS), etc. For example, the devices 101, 105, 107, 109, and others may operate in concert to provide parallel computing features in support of the operation of the control logic 125 and/or the message processing system software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

As mentioned previously, merging multiple communication sessions (having a common ground) into a common communication session using a common communication channel may save computing resources and improve user experience. These features will be further described with reference to FIGS. 2-4.

Figure 2:
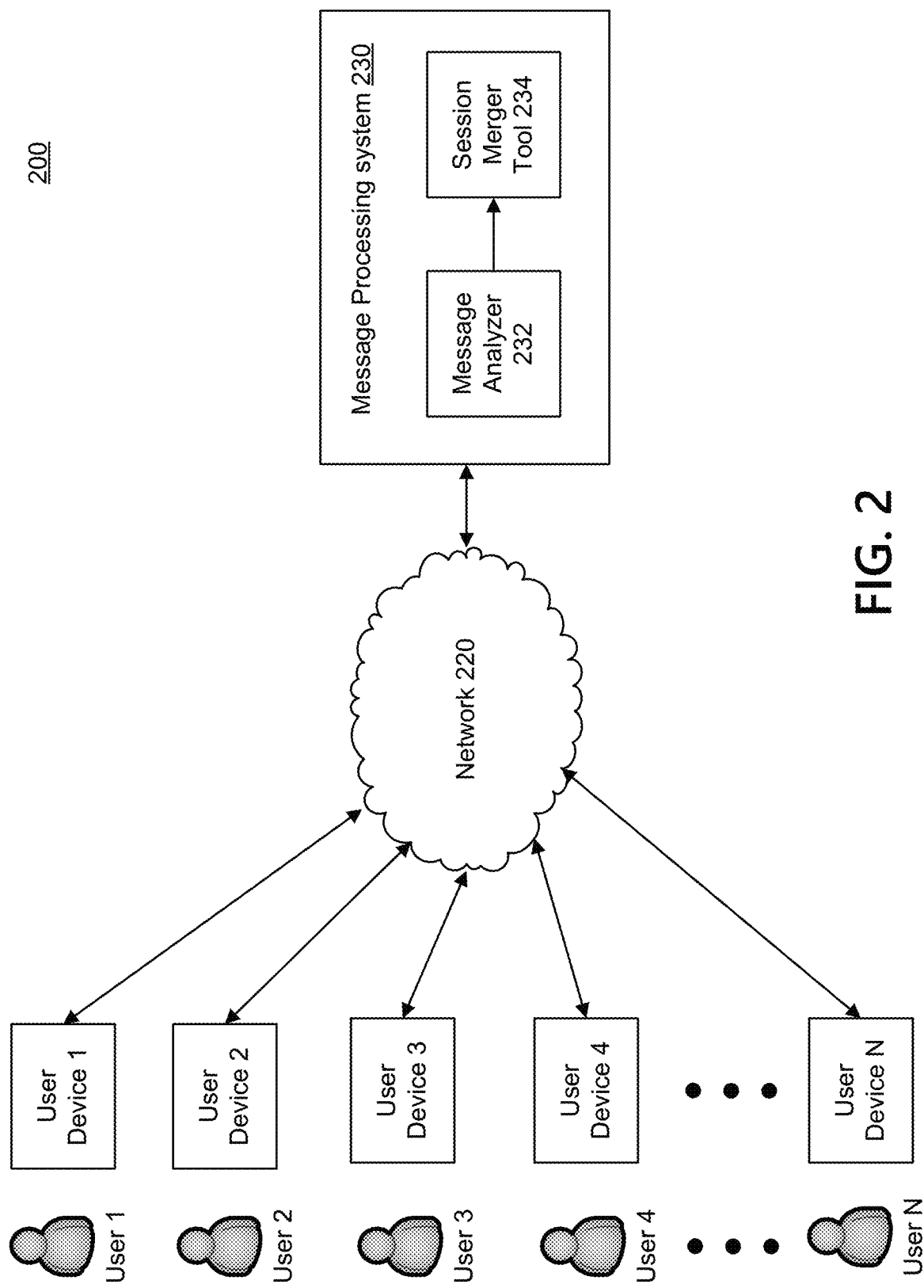
FIG. 2 depicts an example system that manages communication sessions and communication channels according to one or more aspects of the disclosure.
Figure 3A:
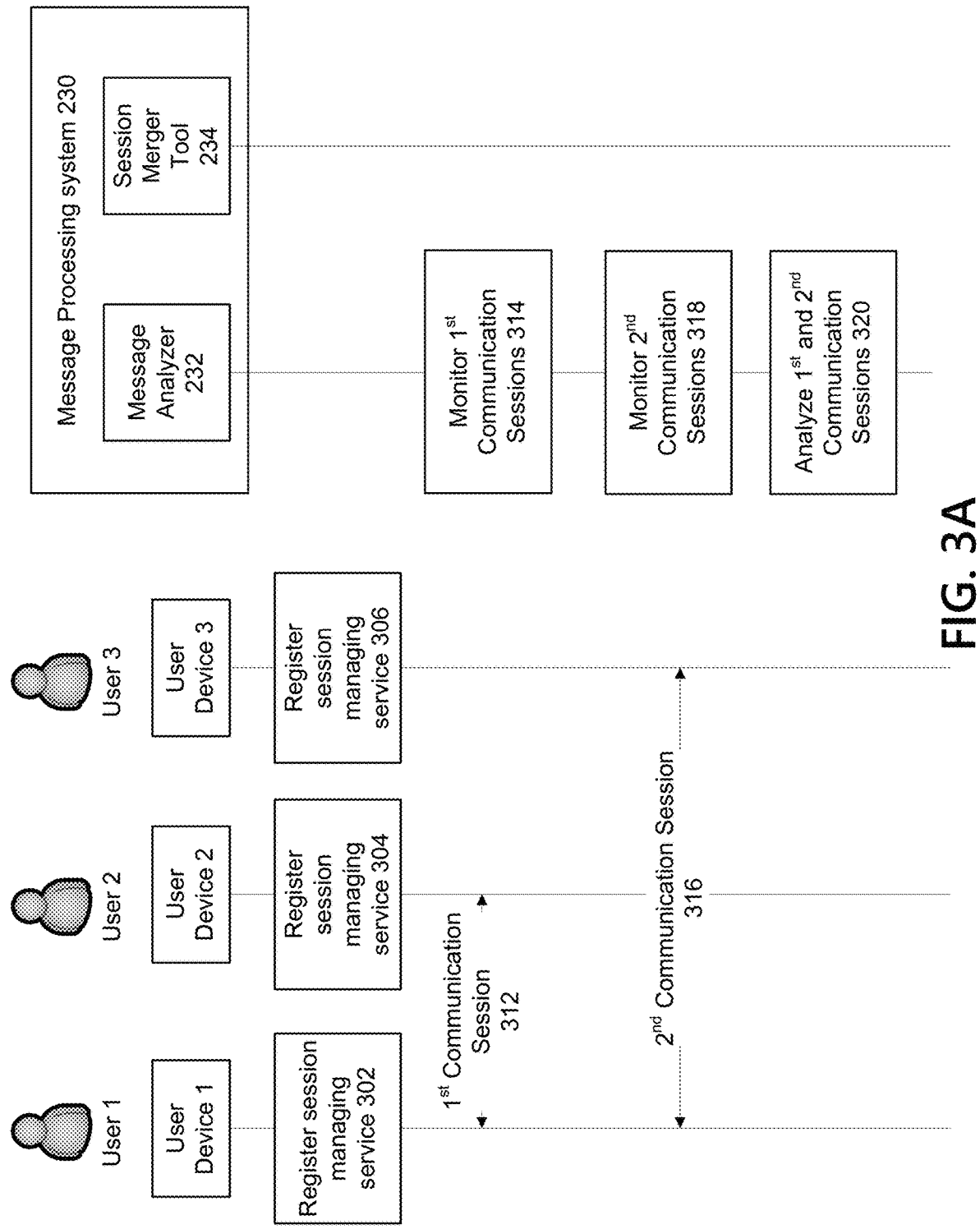
FIGS. 3A-3D constitute a diagram showing an example of managing communication sessions and communication channels.
Figure 3B:
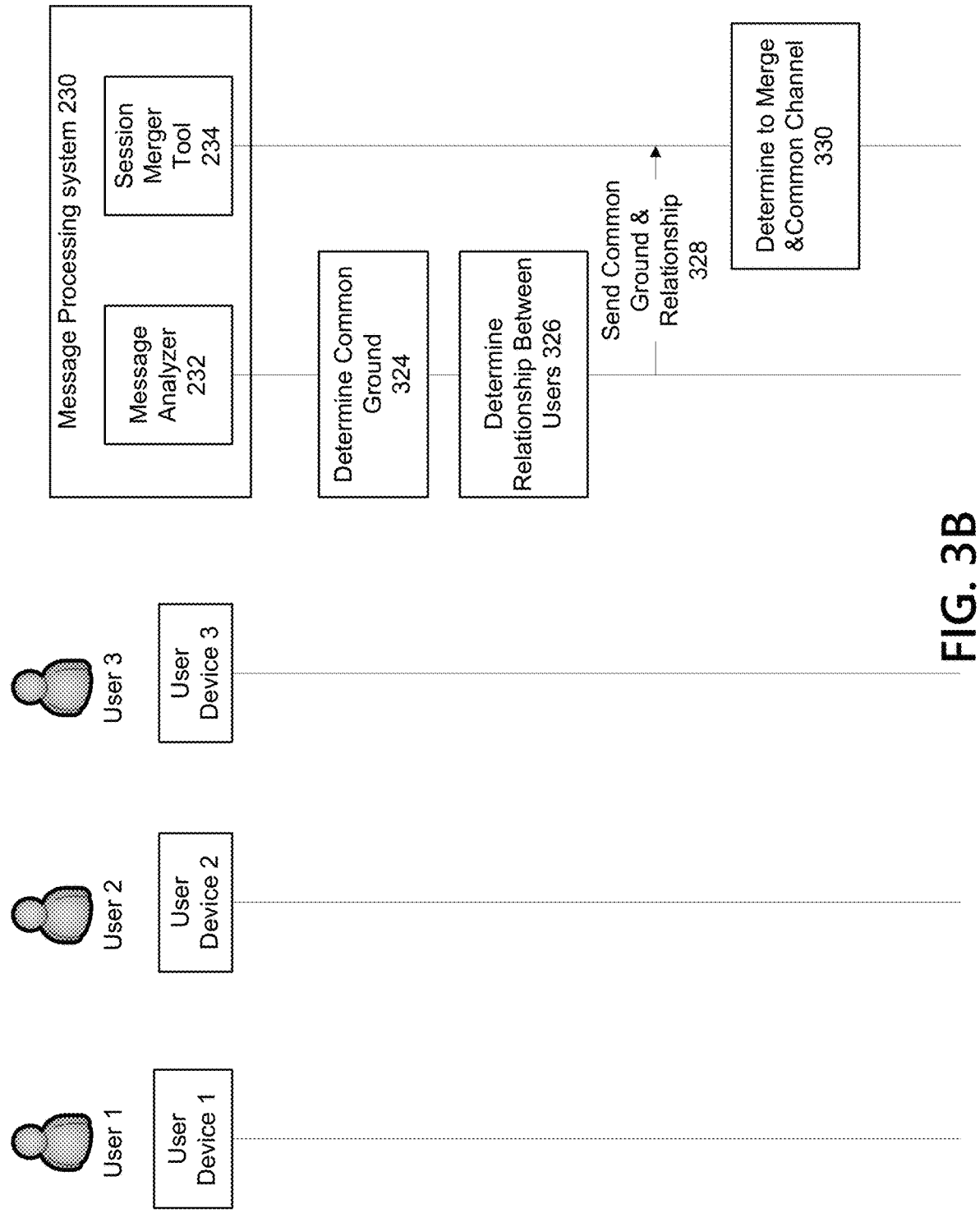
Figure 3C:
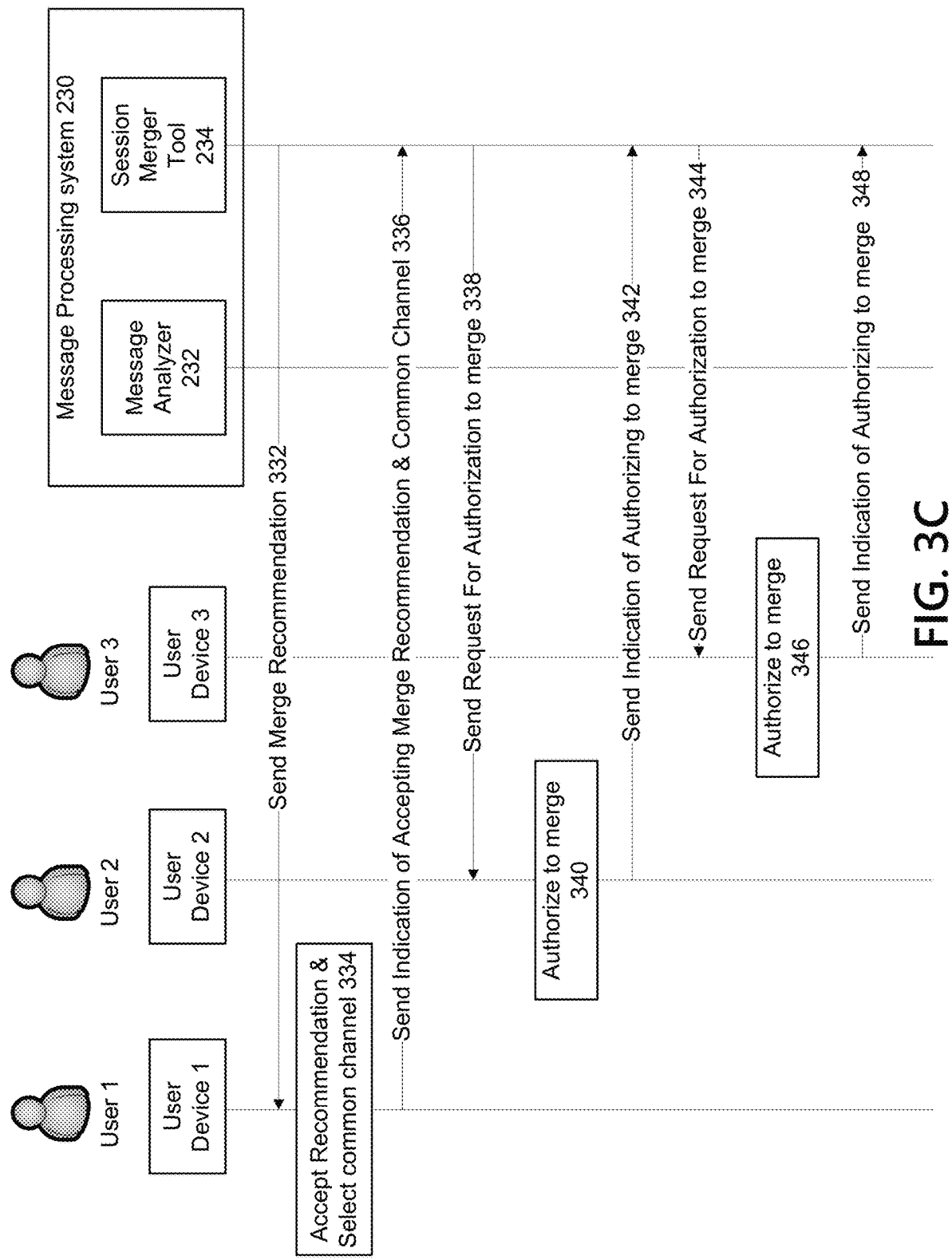
Figure 3D:
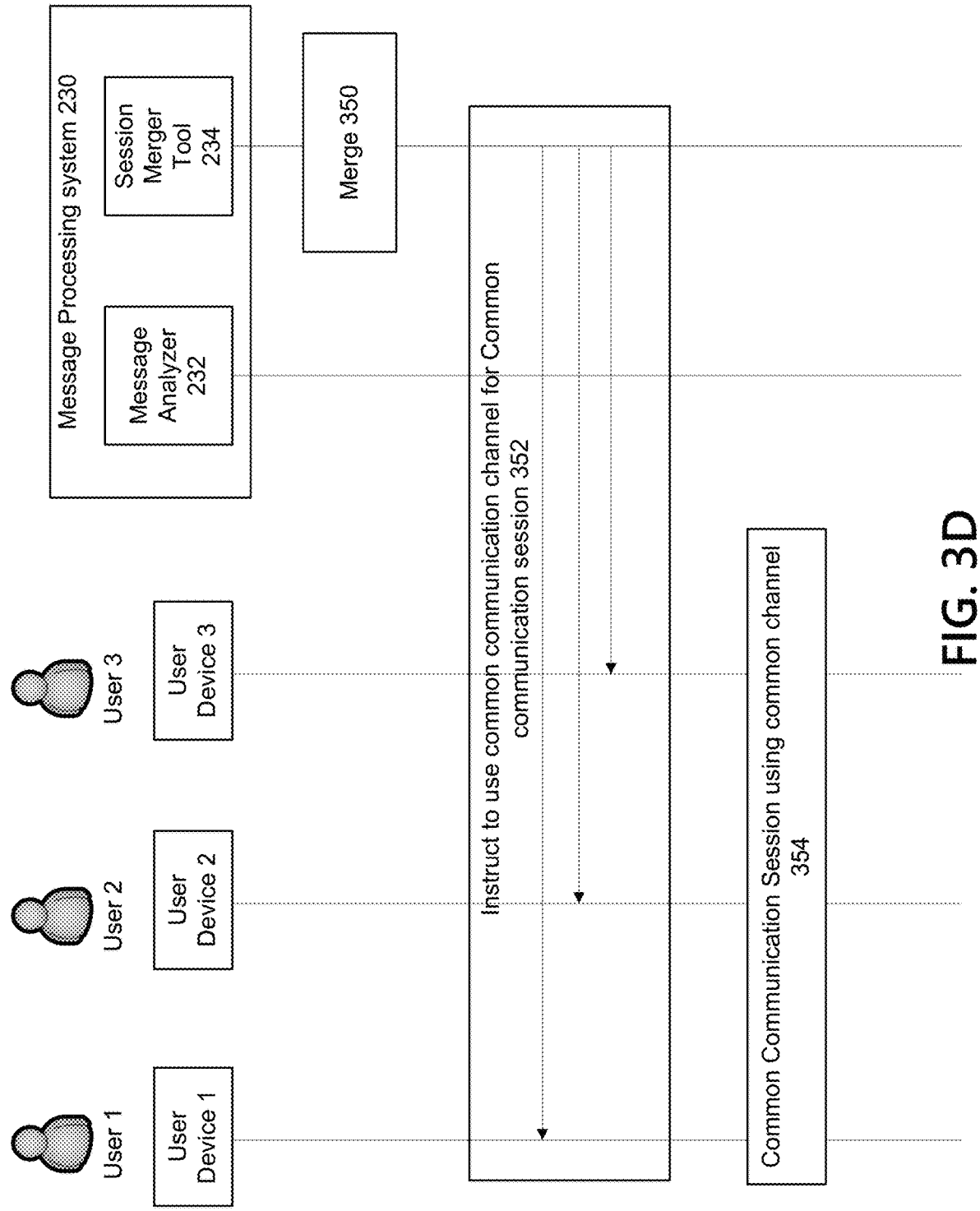

FIG. 2 depicts an example system 200 that may manage communication sessions and communication channels according to one or more aspects of the disclosure. The system 200 may include user devices 1, 2, 3, 4, . . . , and N that are used by one or more users 1, 2, 3, 4, . . . , and N (N may be any number), respectively; a network 220 (similar to the network 103 in FIG. 1); a message processing system 230 that may merge communication sessions having a common ground into a common communication session using a common communication channel; and any other network components. Any of the user devices 1, 2, 3, 4, . . . , and N may be any one of the nodes 105, 107, 109 as shown in FIG. 1.

The one or more users 1, 2, 3, 4, . . . , and N may use user devices 1, 2, 3, 4, . . . , and N to communicate with each other via the network 220. For example, the one or more users may be registered users with the message processing system 230. Each of the one or more users may be associated with a corresponding user profile. The user profile may include one or more of: user's login credentials for accessing the message processing system 230; user's contact list including contact information of user's friends, family members, coworkers, etc.; communication channels (e.g., public or private Twitter channel) available for user to use; user's credentials for accessing the communication channels (e.g., user's Twitter account information); user's identification; user's location; or any other information associated with user. The user profiles may be stored in one or more remote or local databases (not shown) associated with the message processing system 230.

Communication channels may include one or more of: an email channel, a mobile text messaging channel, a short message service (SMS) channel, a public social media channel (e.g., Twitter public messages that can be accessed by the public), a private social media channel (e.g., a channel for sending/receiving Twitter private messages that can only be accessed by the message sender and message recipient), a Slack channel, a web chat channel, a voice communication channel (e.g., a communication channel using voice communication technology, such as a channel for establishing web-based voice conferences), a video communication channel (e.g., a communication channel using voice communication technology, such as a channel for establishing web-based video conferences), or any other types of channels that may be used for communication.

For example, the user 1 may communicate with the user 2 via email messages. The user 1 may use the user device 1 to initiate a communication session with the user 2 by sending the user 2 an email message via the network 220. The user 2 may use the user device 2 to receive the email message and respond to the user 1 by sending another email message to the user 1 via the network 220. As such, the communication session between the user 1 and the user 2 may be established or opened via the email channel, and the communication session may comprise one or more email messages between the user 1 and the user 2.

As another example, the user 1 may communicate with the user 3 via the text messages. The user 1 may use the user device 1 to initiate a communication session with the user 3 by sending the user 3 a text message via the network 220. The user 3 may use the user device 3 to receive the text message and respond to the user 1 by sending another text message to the user 1 via the network 220. As such, a communication session between the user 1 and the user 3 may be established via the mobile text messaging channel, and the communication session may comprise one or more text messages between the user 1 and the user 3.

A communication session may be closed if no new message occurs for a predetermined time period (e.g., 60 days, 90 days, or any time period). For example, for a communication session via the text messaging channel, if users involved in the communication session have not exchanged text messages for 60 days, the communication session may be closed. Alternatively or in addition, a communication session may be closed if the messages included in the communication session are deleted from one or more of the user devices used by the users involved in the communication session and/or from one or more databases that store the messages included in the communication session.

The user 1 may communicate with different users via a same type of communication channels. For example, the user 1 may communicate with the user 2 using the email channel, and may communicate with the user 3 also using the email channel. The user 1 may have a communication session with the user 2 using the email channel, and have another communication session with the user 3 using the email channel. Alternatively or in addition, the user 1 may communicate with different users via different types of communication channels. For example, the user 1 may communicate with the user 2 using the email channel, and may communicate with the user 3 using the mobile text messaging channel. The user 1 may have a communication session with the user 2 using the email channel, and have another communication session with the user 3 using the mobile text messaging channel. The user 1 may communicate with the user 2 and the user 3 at the same time or in different time periods.

The message processing system 230 may monitor messages included in communication sessions among the users 1, 2, 3, 4, . . . N via the network 220, and may process the messages to manage the communication sessions and the communication channels. The message processing system 230 may include a message analyzer 232, a session merger tool 234, and any other network components.

The message analyzer 232 may monitor communication sessions between users, analyze messages included in the communication sessions, and determine similarity or time distance between the communication sessions. If it is determined that the communication sessions have high similarity, the message analyzer 232 may determine that the communication sessions share a common ground. For example, if the message analyzer 232 determines that two or more communication sessions include same content and/or are associated with a common topic, subject, keyword, time, or any other common aspect of communication, the message analyzer 232 may determine that the two or more communication sessions are similar to each other and may share a common ground.

For example, the message analyzer 232 may monitor a first communication session between the user 1 and the user 2 using the email channel, and may monitor a second communication session between the user 1 and the user 3 using the mobile text messaging channel. The first communication session may include part of or all of the email messages between the user 1 and the user 2, and the second communication session may include part of or all of the text messages between the user 1 and the user 3. The message analyzer 232 may analyze the email messages included in the first communication session and the text messages included in the second communication session. The message analyzer 232 may determine similarity between content of the first communication session and content of the second communication session based on the analysis of messages and/or time distance (or time closeness) between the users communicating. Analysis of messages may be based on one or more of natural language processing, machine learning, automated speech recognition (e.g., for processing communication sessions including voice messages), or any other technology that may process language or speech.

The message analyzer 232 may determine whether the first communication session and the second communication session share a common ground by determining whether the two communication sessions have one or more keywords in common. For example, the message analyzer 232 may use one or more of the above-mentioned language/speech processing technologies to process words and/or texts included in the email messages in the first communication session. The message analyzer 232 may determine that the term "presidential election" appears in the email messages 10 times (or any other number that may be suitable for distinguishing high occurrence), and may determine that the first communication session has a keyword "presidential election." Similarly, the message analyzer 232 may process the text messages included in the second communication session, and determine that the second communication also has a keyword "presidential election." Accordingly, the message analyzer 232 may determine that the first communication session and the second communication session have a common keyword "presidential election" and thus share a common ground.

Alternatively or in addition, the message analyzer 232 may determine whether the first communication session and the second communication session share a common ground by determining whether the two communication sessions have a same or similar topic. Even if they do not share one or more keywords, the first communication session and the second communication session may be related to a same or similar topic or subject. If the two communication sessions have a same or similar topic, the message analyzer 232 may determine the first communication session and the second communication session share a common ground. For example, the first communication session may have 10 occurrences of "presidential election," and the second session may have 8 occurrences of "the White House" and 13 occurrences of "vote." The message analyzer 232 may determine that the first communication session and the second communication session have a common topic of presidential election and thus may share a common ground.

Alternatively or in addition, the message analyzer 232 may determine whether the first communication session and the second communication session share a common ground by determining whether the two communication sessions are related to a same or similar subject. For example, the message analyzer 232 may determine that the first communication may have 11 occurrences of "planets" and the second communication may have 9 occurrences of "Earth." The message analyzer 232 may determine that the first communication session and the second communication session are related to a common subject of planets of the Milky Way galaxy and thus may share a common ground.

Alternatively or in addition, the message analyzer 232 may factor in date and/or time information when determining whether the first communication session and the second communication session share a common ground. For example, the message analyzer 232 may determine that the first communication session is established at 11:30 am on the Thanksgiving Day, and the second communication session is established at 12:30 pm on the same Thanksgiving Day. The message analyzer 232 may also determine that the first communication session is related to a subject of turkey and the second session is related to a subject of a party. Even though the subjects of the two communication sessions are not same or similar, the message analyzer 232 may still determine that the two communication sessions share common ground because they are established on the Thanksgiving Day and are likely related to a Thanksgiving dinner menu including turkey.

In some cases, the message analyzer 232 may determine that the two communication sessions do not share a common ground if the time distance between the two communication sessions exceeds a threshold. For example, if the first communication session is established 6 months before the second communication session is established, the message analyzer 232 may determine that the two communication sessions do not share a common ground even if they have a same or similar keyword, topic, or subject. Alternatively or in addition, the message analyzer 232 may determine that the two communication sessions share a common ground if they have a same or similar keyword, topic, or subject, regardless the time distance between the two communication sessions.

The message analyzer 232 may store communication sessions information of one or more monitored communication sessions in one or more local or remote databases. The communication sessions information of a monitored communication session may include one or more of: identification(s) of user(s) involved in a monitored communication session (e.g., identifications of the user 1 and/or the user 2 associated with the first communication session), a channel type of a communication channel used for a monitored communication session (e.g., the email channel used for the first communication session), a time or a time period associated with a monitored communication session (e.g., a time at which the monitored communication session starts, a time at which the monitored communication session ends, a time period during which the monitored communication session lasts, etc.), a content length associated with a monitored communication session (e.g., an average content length of messages included in the monitored communication session, a total content length of the monitored communication session, etc.), messages included in a monitored communication session, or any other aspect of a monitored communication session.

The message analyzer 232 may determine whether users involved in two or more communication sessions are related. For example, if it is determined that the first communication session (between the user 1 and the user 2) and the second communication session (between the user 1 and the user 3) have a common ground, the message analyzer 232 may further determine whether the user 2 and the user 3 are related.

The message analyzer 232 may determine whether the user 2 and the user 3 are related based on the communication sessions information stored in the one or more local or remote databases. For example, the message analyzer 232 may determine, based on the communication sessions information, that there was a prior communication session (a communication session prior to the first and second communication sessions) between the user 2 and the user 3. Accordingly, the message analyzer 232 may determine that the user 2 and the user 3 may know each other and thus are related to each other. As another example, the message analyzer 232 may determine, based on the communication sessions information and by machine learning, that when the user 1 was having a communication session with the user 2, there was a 70% chance that the user 1 was also having a communication session with the user 3 at the same time. Based on such a determination, the message analyzer 232 may determine that the user 2 and the user 3 may be related to each other.

The message analyzer 232 may determine whether the user 2 and the user 3 know each other based on their user profiles. For example, the message analyzer 232 may retrieve the user profile of the user 2, and determine that the user 3 is included in the user 2's contact list. Based on such a determination, the message analyzer 232 may determine that the user 2 and the user 3 are related to each other.

The user 1 may be having more than two (e.g., four) communication sessions with more than two other users (e.g., with the user 2, the user 3, user 4, and the user N), respectively. The message analyzer 232 may monitor the four communication sessions and determine whether the four communication sessions share a common ground. If it is determined that the four communication sessions share a common ground, the message analyzer 232 may determine whether the user 2, the user 3, user 4, and the user N are related to each other.

In some cases, communication sessions do not need to be associated with a common user. In these cases, the message analyzer 232 may still determine if the communication sessions share a common ground, and determine whether the involved users are related to each other. For example, a communication session may be between the user 1 and the user 2, and another communication session may be between the user 3 and the user 4. The message analyzer 232 may determine whether these two communications sessions share a common ground; and if they do, the message analyzer 232 may determine whether the user 1, the user 2, the user 3, and the user 4 are related to each other.

In some cases, more than two users may be involved in one communication session. For example, one communication session may be established between the user 1, the user 2, and the user 3. The message analyzer 232 may determine whether the communication session shares a common ground with another communication session; and if it does, the message analyzer 232 may determine if one or more of the user 1, the user 2, and the user 3 are related to users involved in the another communication session.

If the message analyzer 232 determines that two or more communication sessions share a common ground and that users associated with the two or more communication sessions are related, the message analyzer 232 may send, to the session merger tool 234, an indication that the two or more communication sessions share a common ground and that users associated with the two or more communication sessions are related. Based on the indication, the session merger tool 234 may determine to recommend merging the two or more communication sessions to generate a common communication session between the user 1, the user 2, and the user 3. The session merger tool 234 may determine a common communication channel for the common communication session. The common communication channel may be determined based on the communication channels for the two or more communication sessions, communication channels used for prior communication sessions between the users, and/or content of the two or more communication sessions.

For example, the message analyzer 232 may send an indication to the session merger tool 234 indicating that the first communication session (between the user 1 and the user 2) and the second communication session (between the user 1 and the user 3) share a common ground and that the user 2 and the user 3 are related. The message analyzer 232 may send the session merger tool 234 information about the first and second communication sessions. The information may include one or more of: the common ground (e.g., the common topic, subject, keyword, time) of the first and second communication sessions to be merged, type(s) of communication channel(s) for the first and second communication sessions, information about the users involved in the first and second communication sessions, times associated with the first and the second communication sessions, content lengths associated with the first and the second communication sessions, messages included the first and the second communication sessions, or any other information about the first and second communication sessions.

The common communication channel may be determined based on the communication channels for the first and second communication sessions. For example, the session merger tool 234 may use the received information about the first and second communication sessions to determine that the first communication session is via the email channel and the second communication session is via the mobile text messaging channel. The session merger tool 234 may select either the email channel or the mobile text messaging channel as the common communication channel.

In some cases, more than two communication sessions are determined to be selected for a suggestion to be merged. In these cases, the session merger tool 234 may select the most common communication channel used for the more than two communication sessions. For example, there may be three communication sessions determined to be merged. Two of them may be using the mobile text messaging channel, and the remaining one may be using the Facebook channel. The session merger tool 234 may select the mobile text messaging channel as the common communication channel, for example, based on the two communication sessions using the mobile text messaging channel.

Alternatively or in addition, the common communication channel may be determined based on communication channels used for prior communication sessions (communication sessions prior to the first communication session and the second communication session) between two or more of the user 1, the user 2, and the user 3. For example, the session merger tool 234 may select the most frequently used communication channel between two or more of the user 1, the user 2, and the user 3 as the common communication channel. For example, the session merger tool 234 may use the communication sessions information to determine that during the last 30 days, 60% of prior communication sessions involving all of the user 1, the user 2, and the user 3 used the mobile text messaging channel. The session merger tool 234 may then determine the mobile text messaging channel as the common communication channel. As another example, the session merger tool 234 may use the communication sessions information to determine that during the last 30 days, 60% of prior communication sessions between the user 1 and the user 2 used the email channel and 70% of prior communication sessions between the user 1 and the user 3 used the email channel. The session merger v234 may then determine the email channel as the common communication channel.

Alternatively or in addition, the session merger tool 234 may select a communication channel, different from the communication channels (e.g., the email channel, the mobile text messaging channel) used for the first and second communication sessions, as the common communication channel. For example, if the session merger tool 234 determines, e.g., based on the communication sessions information, that 80% of prior communication sessions involving all of the user 1, the user 2, and the user 3 used the Slack channel, the session merger tool 234 may determine the Slack channel as the common communication channel.

Alternatively or in addition, the session merger tool 234 may determine the common communication channel based on content of the first communication session and content of the second communication session. For example, the session merger tool 234 may determine that the common topic, subject, or keyword of the first and second communication sessions is associated with formal content (e.g., content related to work), the session merger tool 234 may determine to use the email channel as the common communication channel because email messages may be more suitable for exchange work content. If the session merger tool 234 determines that the common topic, subject, or keyword is associated with casual content (e.g., content related to shopping), the session merger tool 234 may determine to use the mobile text messaging channel as the common communication channel.

Alternatively or in addition, the common communication channel may be determined based on content lengths associated with the first communication session and the second communication session. For example, if the session merger tool 234 determines that the average length of the messages included in the first communication session and/or the second communication session exceeds a threshold length (e.g., 300 words), the session merger tool 234 may determine to use the email channel as the common communication channel because email messages may be more suitable for communicate long messages. If the session merger tool 234 determines the average length of the messages does not exceed the threshold length, the session merger tool 234 may determine to use the mobile text messaging channel as the common communication channel.

Alternatively or in addition, the session merger tool 234 may determine multiple potential common communication channels that may be used for the common communication channel. For example, the session merger tool 234 may determine that the best suitable communication channel for the common communication is the email channel, the second best communication channel is the Slack channel, and the third best communication channel is the mobile text messaging channel. The session merger tool 234 may provide options for which communication channel to use to allow the user to select the communication channel for the merged communication.

The session merger tool 234 may determine to merge communication sessions using public communication channels, merge communication sessions using public communication channels and communication sessions using private communication channels, and/or merge communication sessions using private communication channels. The session merger tool 234 may determine to merge any number of communication sessions.

The session merger tool 234 may prevent a private communication session using a private channel from being merged into a common communication session using a common public channel. For example, the session merger tool 234 may receive an indication that there are three communication sessions that share a common topic and all the users involved in the three communication sessions know each other. Two of the three communication sessions are using a same common public communication channel (e.g., Twitter public messages), and the remaining communication session is using a private communication channel (e.g., Twitter private messages). The session merger tool 234 may determine to merge the two communication sessions using the common public communication channel into a common communication session using the common public communication channel, and may prevent the remaining communication session using the private communication channel from being merged into the common communication session.

The session merger tool 234 may send a merge recommendation to at least one of the users associated with communication sessions that are determined to be merged. For example, if the first communication session (between the user 1 and the user 2) and the second communication session (between the user 1 and the user 3) are determined to be merged, the session merger tool 234 may send a merge recommendation to the user 1. The merge recommendation may comprise a user interactive message. The merge recommendation may include one or more of an indication of recommending to merge the first and second communication sessions into a common communication session, or an indication of one or more recommended communication channels for the common communication session.

The indication of recommending to merge may be a pop-up text message, a graphical message, a voice message, or a video recommending merging the first and second communication sessions. For example, the user 1 may be presented with the pop-up text message—"Do you want to merge your communications with the user 2 and the user 3 into a common communication session?"

The indication of the one or more recommended communication channels may be a text message recommending the determined common communication channel, or a drop-down menu listing one or more potential communication channels that may be used for the common communication session. For example, the user 1 may be presented with a text message—"Do you want to use emails to communicate with the user 2 and the user 3 in the common communication session?" As another example, if the indication of the one or more recommended communication channels is a drop-down menu including multiple potential communication channels for the common communication session, the user 1 may select one of potential communication channels from the drop-down menu as the common communication channel for the common communication session.

The merge recommendation may allow the user 1 to accept or decline the recommendation. For example, the merge recommendation may include an "Accept" button and a "Reject" button for the user 1 to click. If the user 1 clicks on the "Accept" button, the user 1 accepts the recommendation to merge. If the user 1 clicks on the "Reject" button, the user 1 declines the recommendation to merge.

Alternatively or in addition, the session merger tool 234 may send request(s) for authorization to merge to at least one of other users involved in the communication sessions to be merged, as such the at least one of other users may have opportunities to determine whether they want to join the common communication session. For example, after the user 1 accepts the merge recommendation, the session merger tool 234 may send a request for authorization to merge to one of or both of the user 2 and the user 3. The request for authorization may include one or more of: an invite to join the common communication session, information about the common communication channel that will be used for the common communication session, information about other users that will be included in the common communication session, or any other information about the common communication session. The request for authorization may comprise a user interactive message. The request for authorization may allow the user 2 and/or the user 3 to determine whether to join the common communication session. For example, the request for authorization may include an "Authorize" button and a "Not Authorize" button for the user 2 and/or the user 3 to click. If the user 2 and/or the user 3 clicks on the "Authorize" button, the user 2 and/or the user 3 accepts the invite to merge. If the user 2 and/or the user 3 clicks on the "Not Authorize" button, the user 2 and/or the user 3 declines the invite to join.

The session merger tool 234 may merge the communication sessions to generate the common communication session via the common communication channel. The common communication session may include part of or entirety of communication sessions to be merged. For example, the session merger tool 234 may include all the messages included in the first communication session and the second communication session in the common communication session, as such all of the user 1, the user 2, and the user 3 may see the entire history of the first and second communication sessions. Alternatively, before merging the first and second communication sessions into the common communication session, the session merger tool 234 may remove some content (e.g., negative comments) from one or more of the first communication session or the second communication session so that the common communication session does not include negative comments.

The message processing system 230 may be disposed remotely from user devices 1, 2, 3, 4, . . . N. Alternatively or in addition, the message processing system 230 may be distributed among the user devices. For example, the message analyzer 232 may be disposed in one or more user devices to analyze the messages included in the communication session(s) associated with the corresponding user devices. The session merger tool 234 may be disposed in one or more user devices to merge the communication sessions associated with the corresponding user devices. The message analyzer 232 may perform any action that is performed by the session merger tool 234 discussed above, and/or the session merger tool 234 may perform any action that is performed by the message analyzer 232 discussed above. The message analyzer 232 and the session merger tool 234 may be integrated as a single component or may be discrete components.

FIGS. 3A-3D constitute a diagram showing an example of managing communication sessions and communication channels. In this example, one or more users (e.g., the user 1, the user 2, and the user 3) may register with the message processing system 230, and the message processing system 230 may manage communication sessions and communication channels for the registered users. The number of users may be any number.

At step 302, the user 1 may use the user device 1 to register with the message processing system 230, and the message processing system 230 may generate a user profile for the user 1. As previously discussed, the user profile for the user 1 may include one or more of: user 1's login credentials for accessing the message processing system 230; user 1's contact list; communication channels available for the user 1 to use; user 1's credentials for accessing the communication channels; user 1's identifications; user 1's location; or any other information associated with the user 1. The user 1 may log in his/her account with the message processing system 230 by inputting user 1's login credentials via a user interface provided by the message processing system 230. The message processing system 230 may use information included in the user profile to access and monitor communication sessions associated with the user 1, and manage communication sessions and communication channels for the user 1.

At steps 304 and 306, the user 2 and the user 3 may use the user device 2 and the user device 3 to register with the message processing system 230, the message processing system 230 may generate user profiles for the user 2 and the user 3, and the user 2 and the user 3 may log in their accounts with the message processing system 230. The steps 304 and 306 may be similar to step 302 discussed above.

At step 312, a first communication session may be established between the user 1 and the user 2 using a first communication channel, such as an email channel. As discussed previously, for example, the user 1 may open the first communication session with the user 2 by sending the user 2 an email message via the user device 1. The user 2 may receive the email message via the user device 2 and respond to the user 1 by sending another email message to the user 1 via the user device 2. As such, the first communication session between the user 1 and the user 2 may be established using the email channel. The communication session may comprise one or more email messages between the user 1 and the user 2.

At step 314, the message analyzer 232 may monitor the first communication session, and/or store communication sessions information of the first communication session in one or more databases. As previously discussed, the communication sessions information of the first communication session may include one or more of: identifications of the user 1 and the user 2 involved to the first communication session, information indicating that the email channel is used for the first communication session, a time or a time period associated with the first communication session, a content length associated with the first communication session, messages included in the first communication session, or any other aspect of the first communication session.

At step 316, a second communication session may be established between the user 1 and the user 3 using a second communication channel, such as a mobile text messaging channel. As discussed previously, for example, the user 1 may open a communication session with the user 3 by sending the user 3 a text message via the user device 1. The user 3 may receive the text message via the user device 3 and respond to the user 1 by sending another text message to the user 1 via the user device 3. As such, the second communication session between the user 1 and the user 3 may be established via the mobile text messaging channel. The communication session may comprise one or more text messages between the user 1 and the user 3.

At step 318, the message analyzer 232 may monitor the second communication session, and/or store communication sessions information of the second communication session in one or more databases. Step 318 may be similar to step 316. For example, the communication sessions information of the second communication session may include one or more of: identifications of the user 1 and the user 3 involved to the second communication session, information indicating that the mobile text messaging channel is used for the second communication session, a time or a time period associated with the second communication session, a content length associated with the second communication session, messages included in the second communication session, or any other aspect of the second communication session.

If there are any communication sessions prior to the first and second communication session, the communication sessions information may also include communication sessions information of the prior communication sessions (the communication sessions prior to the first and second communication session).

At step 320, the message analyzer 232 may analyze the first communication session and the second communication session to determine similarity or time distance between the first and second communication sessions. For example, the message analyzer 232 may determine the similarity or time distance between the first and second communication sessions based on the content of the first communication session and the content of the second communication session. The message analyzer 232 may use natural language processing, machine learning, or any other technology that may process language and/or words to determine the similarity or time distance between the first and second communication sessions. For example, the message analyzer 232 may use word embedding techniques to measure similarity between linguistic items of the email messages included in the first communication session and linguistic items of the text messages included in the second communication session. If the message analyzer 232 determines that linguistic items of the email messages and linguistic items of the text messages have significant overlap (e.g., 40% of the linguistic items in the email messages are same as or similar to the linguistic items in the text messages content), the message analyzer 232 may determine that the first and second communication sessions have high similarity. As previously discussed, as another example, if the message analyzer 232 determines that the first communication session and the second communication session share a common topic, subject, or keyword, the message analyzer 232 may determine that the first and second communication sessions have high similarity.

As another example, the message analyzer 232 may determine the similarity or time distance between the first and second communication sessions based on times associated with the first and second communication sessions. For example, if the second communication session is opened right after (e.g., in 10 seconds) the first communication session is opened and/or a text message in the second communication session is transmitted right after (e.g., in 15 seconds) an email message in the first communication is transmitted, the message analyzer 232 may determine that the first and second communication sessions have high similarity.

At step 324, if the message analyzer 232 determines that the first and second communication sessions have high similarity, the message analyzer 232 may determine that the first and second communication sessions share a common ground. As previously discussed, the common ground may include one or more of a common topic, a common subject, a common keyword, a common time (or a time common period), or any other common aspect of communication.

At step 326, the message analyzer 232 may determine whether the user 2 and the user 3 are related to each other. As previously discussed, for example, the message analyzer 232 may use the communication sessions information of the prior communication sessions to determine whether the user 2 and the user 3 have previously communicated with each other prior to the first and second communication sessions. If it is determined that the user 2 and the user 3 have previously communicated with each other, the message analyzer 232 may determine that the user 2 and the user 3 know each other and are related to each other. As previously discussed, as another example, the message analyzer 232 may use information included in the user profiles of the user 2 and the user 3 to determine whether one of the user 2 and the user 3 is in the other one's contact list. If it is determined that one of the user 2 and the user 3 is in the other one's contact list, the message analyzer 232 may determine that the user 2 and the user 3 know each other and are related to each other.

In addition, the message analyzer 232 may also determine how the user 2 and the user 3 are related. For example, the message analyzer 232 may determine how the user 2 and the user 3 are related respect to the user 1, e.g., relatives to the user 1, coworkers of the user 1, are friends of the user 1, etc. As another example, the message analyzer 232 may determine how the user 2 and the user 3 are related to each other, e.g., being relatives, coworkers, friends, etc. Such a determination may be based on the user profiles of the user 1, the user 2, and the user 3.

At step 328, the message analyzer 232 may send the session merger tool 234 an indication that the user 1 has opened the first and second communication sessions with the user 2 and the user 3, that the first and second communication sessions share a common ground, and that the user 2 and the user 3 know each other. As discussed previously, the message analyzer 232 may send the session merger tool 234 information about the first and second communication sessions. The information may include one or more of: the common ground of the first and second communication sessions, type(s) of communication channel(s) for the first and second communication sessions, information about the relationship between the user 2 and the user 3 (e.g., how the user 2 and the user 3 are related), times associated with the first and the second communication channels, content lengths of the first and the second communication channels, messages included the first and the second communication channels, or any other information about the first and second communication sessions.

As step 330, based on the indication and information received at step 328, the session merger tool 234 may determine to recommend merging the first and second communications into a common communication session, such that the user 1, the user 2, and the user 3 may communicate with each other in a common conversation. The session merger tool 234 may determine one or more common communication channels for the common communication session. As previously discussed, the common communication channel may be determined based on one or more of: the information about the first and second communication sessions that was received from the message analyzer 232 at step 328, or the communication sessions information that was stored at step 318. For example, the common communication channel may be determined based on one or more of: communication channel(s) used for the first and second communication sessions; communication channel(s) used for prior communication sessions involving one or more of the user 1, the user 2, or the user 3; content associated with one or more of the first communication session or the second communication session; etc. One or more previously-discussed methods for determining the common communication channel may be implemented in step 330.

At step 332, the session merger tool 234 may send a merge recommendation to the user device 1. The user device 1 may present the merge recommendation to the user 1, asking if the user 1 agrees to merge the first and second communication sessions into a common communication session. As discussed previously, the merge recommendation may include one or more of: an indication of recommending to merge the first and second communication sessions into a common communication channel, or an indication of one or more recommended communication channels for the common communication session. The merge recommendation may comprise a user interactive message that allows the user 1 to either accept or decline the merge recommendation.

The merge recommendation may also include one or more of: information about the user 2 and the user 3 who will be included in the common communication session (e.g., how the user 2 and the user 3 are related), one or more recommended names for the common communication session (e.g., a recommendation name of "Thanksgiving family dinner" if the common topic is about Thanksgiving party among family members and the user 1, the user 2, and the user 3 are relatives), or any other information about the common communication session. In some cases, the merge recommendation may also allow the user 1 to propose (e.g., input) alternative common communication channel, alternative name, or any other alternative information about the common communication session.

At step 334, the user 1 may accept the merge recommendation. The user 1 may also accept at least one of: the recommended common communication channel(s) for the common communication session, the recommended name for the communication session, or any other information about the common communication session. Alternatively, the user 1 may accept the merge recommendation but propose an alternative common communication channel and/or alternative name.

At step 336, the user device 1 may send the session merger tool 234 an indication that the user 1 has agreed to merge and has accepted a recommended common communication channel and/or a recommended name for the common communication session. Alternatively, if the user 1 has proposed an alternative common communication channel and/or alternative name at step 334, the session merger tool 234 may update common communication channel and/or name based on the user 1's proposal.

The session merger tool 234 may request at least one of the user 2 and the user 3 authorize the merging. At step 338, the session merger tool 234 may send the user 2 a request for authorization to merge. As discussed previously, the request for authorization may include one or more of: an invite to join the common communication session, information about the common communication channel that has been selected for the common communication session, information about other users (the user 1 and the user 3) that will be included in the common communication session, the name for the common communication session, or any other information about the common communication session. The request for authorization may comprise a user interactive message, and may allow the user 2 to determine whether to join the common communication session. In some cases, the request for authorization may also allow the user 2 to propose (e.g., input) alternative common communication channel, alternative name, or any other alternative information about the common communication session.

At step 340, the user 2 may use the user interactive request to authorize the merging, and may accept to use the common communication channel and the name that were chosen or proposed by the user 1. Alternatively, the user 3 may authorize the merging but propose an alternative common communication channel and/or alternative name.

At step 342, the user device 2 may send the session merger tool 234 an indication that the user 2 has authorized the merging and that the user 2 has accepted the common communication channel and the name that were chosen or proposed by the user 1. Alternatively, if the user 2 has proposed an alternative common communication channel and/or alternative name at step 340, the indication may further include the alternative common communication channel and/or alternative name. In this case, the session merger tool 234 may present (e.g., via the first communication session) the user 2's proposal to the user 1, and the user 1 and the user 2 may communicate with each other via the first communication session to determine whether to accept the alternative common communication channel and/or alternative name. If the user 1 and the user 2 agree on the user 2's proposal, the session merger tool 234 may update the common communication channel and/or name based on the user 2's proposal.

At step 344, the session merger tool 234 may send the user device 3 a request for authorization to merge. The step 344 may be similar to the step 338 discussed above. At step 346, the user 3 may authorize the merging. The step 346 may be similar to step 340 discussed above. At step 348, the user device 3 may send the session merger tool 234 an indication that the user 3 has authorized the merging. The step 348 may be similar to step 342 discussed above.

After the session merger tool 234 receives the indications that the user 1 has accepted the merge recommendation and the user 2 and the user 3 have authorized to merge, and the common communication channel and the name that all the users have agreed on, the session merger tool 234 may merge the first and the second communication sessions to generate the common communication session (step 350). The common communication session may include part of or entirety of the first communication session and/or part of or entirety of the second communication session. For example, before the merging, the session merger tool 234 may remove negative comments from one or more of the first communication session or the second communication session, as such the negative comments will not appear in the common communication session.

At step 352, the session merger tool 234 may send instructions to the user device 1, the user device 2, and the user device 3 to use the common communication channel for the common communication session. For example, the common communication channel may be the mobile text messaging channel Since the user 1 and user 3 already used the mobile text messaging channel to communicate, the session merger tool 234 may allow them to continue to use the mobile text messaging channel for the common communication session. For the user 2 (who previously used the email channel to communicate), the session merger tool 234 may send instructions to the user device 2 to open the text messaging application as such the user 2 may send and receive text messages during the common communication session. Alternatively or in addition, the session merger tool 234 may send the user 3's mobile phone number to the user 2 so that the user 2 may use user 3's mobile phone number to send text messages to the user 3.

As step 354, the user 1, the user 2, and the user 3 may use the common communication channel to communicate with each other in the common communication session. After the first and second communications are merged into the common communication session, the first and second communication sessions may be maintained or closed.

In some cases, one or more of the steps 304 and 306 may be omitted because the user 2 and the user 3 do not need to be registered users for the message processing system 230 to merge the first and second communication sessions. In these cases, the message processing system 230 may still use the user 1's user profile to access and monitor the first and second communications associated with the user 1, determine whether the first and second communication sessions have a common ground based on language/speed processing techniques and/or times associated with the first and second communication sessions, and determine whether the user 2 and the user 3 are related based on whether the user 1 frequently had prior communications with the user 2 and the user 3 at the same time. If the message processing system 230 determines that the first and second communication sessions share a common ground and the user 2 and the user 3 are related to each other, the message processing system 230 may obtain the contact information of the user 2 and the user 3 from the user 1's user profile, and use the contact information of the user 2 and the user 3 to invite the user 2 and the user 3 to join the common communication session.

Figure 4:
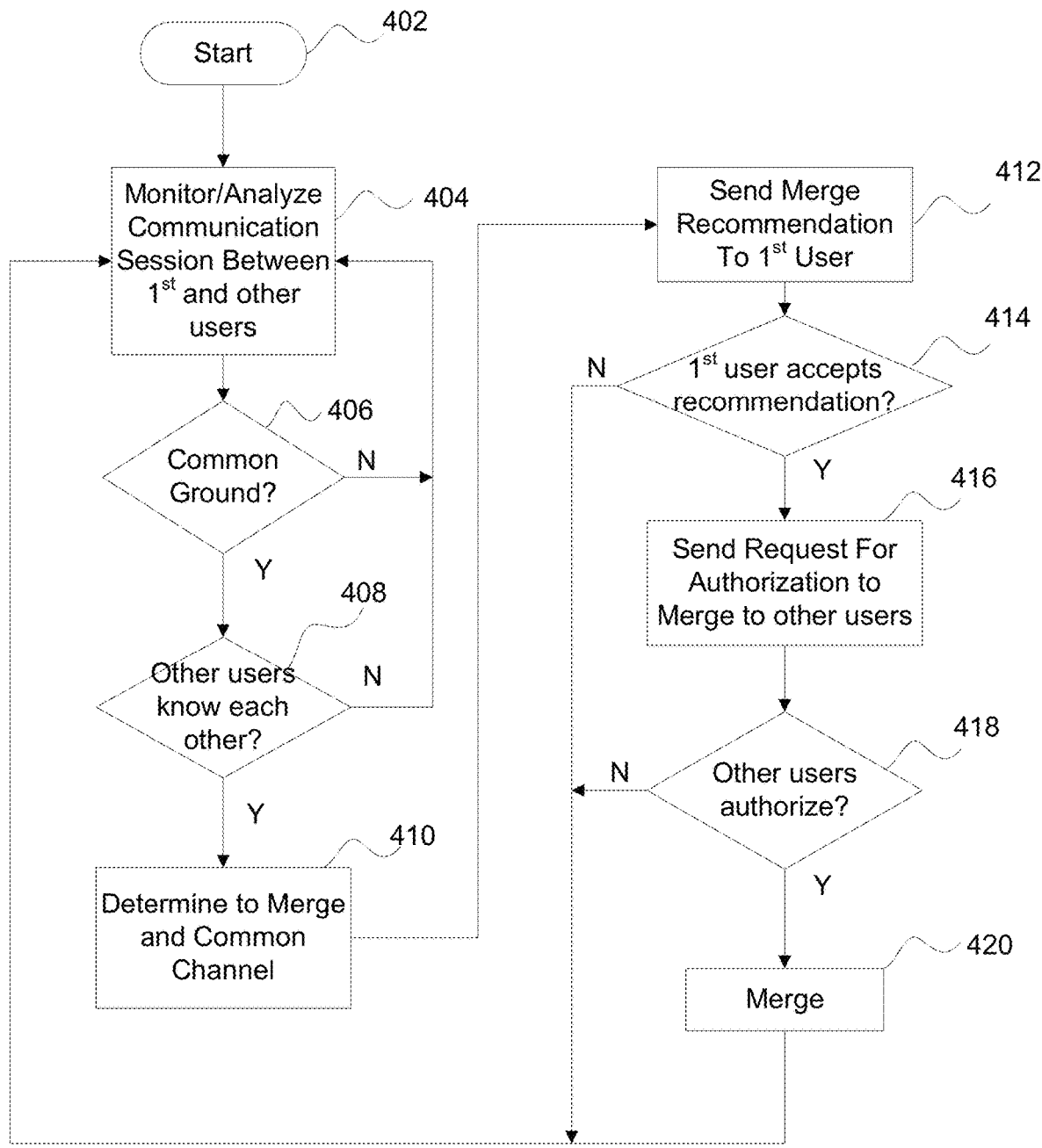
FIG. 4 depicts an example method of managing communication sessions and communication channels according to one or more aspects of the disclosure.

FIG. 4 depicts an example method of managing communication sessions and communication channels according to one or more aspects of the disclosure. In this example, the process may start at step 402 where a first user may register with the message processing system 230. Similar to the previous discussions in connection to steps 302, 304, and 306, the first user may register with the message processing system 230, and the message processing system 230 may generate corresponding user profiles for the first user. The message processing system 230 may use information included in the user profile of the first user to access and monitor communication sessions associated with the first user, and manage communication sessions and communication channels for the first user.

At step 404, the message processing system 230 may monitor communication sessions associated with the first user. For example, the message processing system 230 may use information included in the user profile of the first user (e.g., first user's credentials for accessing communication channels available for the first user) to access and monitor messages included in communication sessions associated with the first user. Similar to the previous discussions in connection to steps 312, 314, 316, 318, and 320, the message processing system 230 may monitor and analyze communication sessions between the first user and other users, and determine similarity or time distance between two or more of the communication sessions between the first user and other users.

At step 406, the message processing system 230 may determine whether two or more of the communication sessions between the first user and other users share a common ground based on the similarity determined at step 404. Prior discussions in connection with the step 324 may be applied to step 406. For example, if the two or more of the communication sessions have high similarity, the message processing system 230 may determine the two or more of the communication sessions share a common ground. And the process may then proceed to step 408. If the two or more of the communication sessions do not have high similarity, the message processing system 230 may determine the two or more of the communication sessions do not share a common ground. And the process may return to step 404 where the message processing system 230 continues to monitor communication sessions associated with the first user.

At step 408, the message processing system 230 may determine whether other users involved in the two or more of the communication sessions (sharing a common ground) are related to each other. Prior discussions in connection with the steps 326 and 328 may be applied to step 408. If it is determined that the other users are related to each other, the process may proceed to step 410. Otherwise, the process may return to step 404 where the message processing system 230 continues to monitor communication sessions associated with the first user.

At step 410, the message processing system 230 may determine to recommend merging the two or more of the communication sessions into a common communication session using a common communication channel, such that all the users involved in the two or more of the communication sessions may have a common conversation via a common communication channel. The message processing system 230 may determine one or more communication channels for the common communication session. Prior discussions in connection with the step 330 may be applied to step 410.

At step 412, the message processing system 230 may send a merge recommendation to the first user. The merge recommendation may include one or more of: an indication of recommending to merge the first and second communication sessions into a common communication channel, an indication of the one or more recommended communication channels for the common communication session, information about other users who will be included in the common communication session, one or more recommended names for the common communication session, or any other information about the common communication session. Prior discussions in connection with the step 332 may be applied to step 412.

At step 414, the message processing system 230 may receive an indication whether the first user has accepted the merge recommendation. Prior discussions in connection with the steps 334 and 336 may be applied to step 414. If the first user has accepted the merge recommendation, the process may proceed to step 416. If the first user has declined the merge recommendation, the process may return to step 404 where the message processing system 230 continues to monitor communication sessions associated with the first user.

At step 416, the message processing system 230 may send requests for authorization to merge to other users involved in the two or more communication sessions. Prior discussions in connection with the steps 340 and 342 may be applied to step 416.

At step 418, the message processing system 230 may receive indication(s) whether other users have authorized the merging. If the one or more of other users has authorized the merging, the process may proceed to step 420. If the other users have declined the merging, the process may return to step 404 where the message processing system 230 continues to monitor communication sessions associated with the first user.

In some cases, some of the other users may authorize the merging and others may decline the merging. In these cases, the message processing system 230 may merge the communication sessions associated with those who have agreed to merge, and may prevent the communication sessions associated with those who have declined to merge from being merged into the communication session.

At step 420, the message processing system 230 may merge the two or more communication sessions into a common communication using a common communication channel that all the involved users have agreed on. Prior discussions in connection with the steps 350, 352, and 354 may be applied to step 420. After the merging, the process may return to step 404 where the message processing system 230 continues to monitor communication sessions associated with the first user.

Although examples are described above, features and/or steps of those examples may be combined, divided, omitted, rearranged, revised, and/or augmented in any desired manner. For example, step 408 may be omitted, and the system may determine to merge communication sessions sharing common regardless whether the other users involved in the communication sessions know each other. In this case, the system may still allow the other users to determine whether to authorize the merging at step 418. As another example, steps of 414, 416, 418, 420 may be omitted, and the message processing system 230 may automatically merge the communication sessions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a server; and
a first user device,
wherein the server is configured to:
monitor, using natural language processing, a first communication session between the first user and a second user device;
monitor, using the natural language processing, a second communication session between the first user device and a third user device;
based on a determination of a common ground between the first communication session and the second communication session and based on a determination that the first communication session and the second communication session are not private channels, generate a recommendation to merge the first communication session and the second communication session into a third communication session; and
based on receiving an indication of acceptance of the recommendation, establish the third communication session at least by:
retrieving, from a first user profile associated with the first user device, one or more first user credentials that provide access to one or more first communication channels;
retrieving, from a second user profile associated with the second user device, one or more second user credentials that provide access to one or more second communication channels; selecting, based on the one or more first communication channels and the one or more second communication channels, a communication channel to use for the third communication session; and
accessing, using the first retrieved user credentials and the second retrieved user credentials, the communication channel determined to be used for the third communicaton session; and
wherein the first user device is configured to:
send, via the first communication session, communications to a second user associated with the second user device;
send, via the second communication session, communications to a third user associated with the third user device;
receive the recommendation to merge the first communication session and the second communication session;
send the indication of acceptance of the recommendation; and
send, via the third communication session, communications to the second user device and the third user device.

2. The system of claim 1, wherein the server is configured to:
determine based on the communication channel determined to be used for the third communication session, a type of communication channel for the third communication session; and
send, to the first user device, an indication of the type of communication channel with the recommendation.

3. The system of claim 2, wherein the type of communication channel comprises at least one of:
an email channel;
a mobile text messaging channel; a social media channel;
a web chat channel;
a voice communication channel; or
a video communication channel.

4. The system of claim 1, wherein the common ground comprises at least one of:
a first subject of the first communication session overlapping with a second subject of the second communication session;
a first topic associated with the first communication session overlapping with a second topic associated with the second communication session;
one or more first keywords associated with the first communication session overlapping with one or more second keywords associated with the second communication session; or
a first time associated with the first communication session being proximate to a second time associated with the second communication session.

5. The system of claim 1, wherein the server is further configured to determine a relationship between a second user associated with the second user device and a third user associated with the third user device, wherein the recommendation is based on the relationship between the second user and the third user.

6. The system of claim 1, wherein the server is configured to:
send, to the second user device and the third user device, a request for authorization to merge the first communication session and the second communication session; and
receive, from the second user device and the third user device, authorization to merge the first communication session and the second communication session.

7. The system of claim 1, wherein the third communication session comprises one or more of:
a first subset of communications from the first communication session; or
a second subset of communications from the second communication session.

8. The system of claim 1, wherein the server is configured to establish the third communication sessions by filtering one or more of:
a first subset of communications from the first communication session; or
a second subset of communications from the second communication session.

9. A computer-implemented method comprising:
monitoring, by a server using natural language processing, a first communication session between a first user device and a second user device;
monitoring, using the natural language processing, a second communication session between the first user device and a third user device;
based on a determination of a common ground between the first communication session and the second communication session and based on a determination that the first communication session and the second communication session are not private channels, generating a recommendation to merge the first communication session and the second communication session into a third communication session; and
based on receiving an indication of acceptance of the recommendation, establishing the third communication session at least by:
retrieving, from a first user profile associated with the first user device, one or more first user credentials that provide access to one or more first communication channels;

retrieving, from a second user profile associated with the second user device, one or more second user credentials that provide access to one or more second communication channels;

selecting, based on the one or more first communication channels and the one or more second communication channels, a communication channel to use for the third communication session; and accessing, using the first retrieved user credentials and the second retrieved user credentials, the communication channel determined to be used for the third communication session.

10. The computer-implemented method of claim 9, further comprising:

determining, based on the communication channel determined to be used for the third communication session, a type of communication channel for the third communication session; and sending, to the first user device, an indication of the type of communication channel with the recommendation.

11. The computer-implemented method of claim 10, wherein the type of communication channel comprises at least one of:

an email channel;
a mobile text messaging channel;
a social media channel;
a web chat channel;
a voice communication channel; or
a video communication channel.

12. The computer-implemented method of claim 9, wherein the common ground comprises at least one of:

a first subject of the first communication session overlapping with a second subject of the second communication session;

a first topic associated with the first communication session overlapping with a second topic associated with the second communication session;

one or more first keywords associated with the first communication session overlapping with one or more second keywords associated with the second communication session; or a first time associated with the first communication session being proximate to a second time associated with the second communication session.

13. The computer-implemented method of claim 9, further comprising:

determining a relationship between the second user associated with the second user device and a third user associated with the third user device, wherein the recommendation is based on the relationship between the second user and the third user.

14. The computer-implemented method of claim 9, further comprising:

sending, to the second user device and the third user device, a request for authorization to merge the first communication session and the second communication session; and receiving, from the second user device and the third user device, authorization to merge the first communication session and the second communication session.

15. The computer-implemented method of claim 9, wherein the third communication session comprises one or more of:

a first subset of communications from the first communication session; or a second subset of communications from the second communication session.

16. The computer-implemented method of claim 9, further comprising:

further establishing the third communication sessions by filtering one or more of:

a first subset of communications from the first communication session; or a second subset of communications from the second communication session.

17. The computer-implemented method of claim 9, further comprising:

monitoring a fourth communication session between the first user device and a fourth user device;

determining that the fourth communication session is via a private communication channel; and preventing the fourth communication session from being merged into the third communication session.

18. A computer-implemented method comprising:

sending, by a first user device via a first communication session, one or more communications to a second user device;

sending, by the first user device via a second communication session, one or more communications to a third user device;

receiving, by the first user device and from a server, a recommendation to merge the first communication session and the second communication session, wherein the recommendation to merge is based on a determination that the first communication session and the second communication session are not private channels;

sending, by the first user device and to the server, an acceptance of the recommendation, wherein sending the acceptance causes the server to establish a third communication session at least by:

retrieving, from a first user profile associated with the first user device, one or more first user credentials that provide access to one or more first communication channels;

retrieving, from a second user profile associated with the second user device, one or more second user credentials that provide access to one or more second communication channels;

selecting, based on the one or more first communication channels and the one or more second communication channels, a communication channel to use for the third communication session; and accessing, using the first retrieved user credentials and the second retrieved user credentials, the communication channel determined to be used for the third communication session; and sending, by the first user device via a third communication session, one or more communications to the second user device and the third user device.

19. The computer-implemented method of claim 18, wherein the third communication session comprises at least one of:

an email channel;
a mobile text messaging channel;
a social media channel;
a web chat channel;
a voice communication channel; or
a video communication channel.

20. The computer-implemented method of claim 18, wherein the third communication session comprises one or more of:

a first subset of communications from the first communication session; or a second subset of communications from the second communication session.

\* \* \* \* \*